(12) United States Patent
Rambole et al.

(10) Patent No.: US 12,493,643 B2
(45) Date of Patent: Dec. 9, 2025

(54) SMART ANNOTATION FRAMEWORK (71) Applicant: State Farm Mutual Automobile Insurance Company, Bloomington, IL (US)

(72) Inventors: Jeff Rambole, Danville, IL (US); Greg Davis, Bloomington, IL (US); Jun Wen, Plano, TX (US); Timothy John Husarik, Normal, IL (US); Anjie Spreen, Hewitt, TX (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 0 days.

(21) Appl. No.: 18/584,945

(22) Filed: Feb. 22, 2024

(65) Prior Publication Data
US 2025/0272331 A1 Aug. 28, 2025

(51) Int. Cl.
*G06F 16/353* (2025.01)
(52) U.S. Cl.
CPC .................................. *G06F 16/353* (2019.01)
(58) Field of Classification Search
CPC .................................................... G06F 16/353
See application file for complete search history.

(56) References Cited

U.S. PATENT DOCUMENTS

| | | | |
|---|---|---|---|
| 6,505,197 B1 | 1/2003 | Sundaresan | |
| 10,846,341 B2 * | 11/2020 | Cerino | G06F 16/285 |
| 10,963,518 B2 | 3/2021 | Aggour | |
| 11,544,795 B2 | 1/2023 | Wang | |
| 2006/0112110 A1 | 5/2006 | Maymir-Ducharme | |
| 2014/0058983 A1 * | 2/2014 | Alexander | G06N 20/00 706/12 |
| 2020/0073882 A1 * | 3/2020 | Guggilla | G06N 5/02 |
| 2021/0019339 A1 * | 1/2021 | Ghulati | G06F 40/284 |
| 2023/0333919 A1 * | 10/2023 | Habti | G06F 9/541 |

* cited by examiner

*Primary Examiner* — Jared M Bibbee
(74) *Attorney, Agent, or Firm* — Lee & Hayes, P.C.

(57) ABSTRACT

A computer-implemented method that includes a programmatically configured annotation processor that may include a processing engine for ingesting using an orchestrated solution that includes a plurality of data objects of one or more data formats. The annotation processor may further identify, using an orchestrated annotation recognition engine, one or more attributes of a data object. The orchestrated annotation recognition engine is configured to determine attribute data from a data object. The data objects are further classified by one or more attributes for associating at least one data object into one or more data sets of annotation data and metadata wherein the annotation data is based on the metadata. The annotation model is generated, based on at least a classified data set of the annotation data and the metadata. The annotation model is configured using the annotation data and metadata wherein the annotation data is created by industry-specific input.

20 Claims, 8 Drawing Sheets

SMART ANNOTATION FRAMEWORK

TECHNICAL FIELD

The present disclosure relates to programmatic annotation of unstructured data, and more particularly, to a method for annotating ingested unstructured data and applying one or more cognitive intelligence solutions for adding metadata based on a business context to assist in identifying a set of metadata that can be used in constructing a business-specific solution.

BACKGROUND

Organizations have vast amounts of data stored in data repositories that are accessible for analysis. The process of ingesting and analyzing these large amounts of data may be dependent on the document type and processing capabilities that allow for efficient and accurate document ingestion. The process flow may involve the intake of documents and tools for extracting relevant metadata to be able to search the documents.

Automated data annotation while efficient has drawbacks, as labeling of data objects, especially for industry-specific applications may not be deemed sufficiently accurate enough as automated processes may lack the vernacular and usage know-how that is industry-specific for performing such tasks with higher degrees of accuracy.

The systems and methods described herein may be directed toward collecting data and filtering the data to identify a set of metadata that can be used as annotation data which can then be combined with inputted industry-specific data for enhanced modeling of industry-specific Artificial intelligence (AI) algorithmic solutions. Also, once the data is filtered, one or more users (e.g., annotators) can quickly add data or enrich data of the set of data for a particular business context and port the contextual information back into the metadata for later searchability and modeling of business contextual solutions.

SUMMARY

Described herein are methods and systems for configuring an annotation model based in part on industry-specific input and using various cognitive solutions for modeling metadata for data objects received from an ingesting process of voluminous amounts of unstructured data (or structured data) from text data, audio data, image data, and video data.

In some examples, the techniques described herein relate to a computer-implemented method, which includes ingesting data and data management of the ingested data. For instance, a programmatically configured annotation processor may be implemented that uses at least one orchestrated solution. The orchestrated solution includes sending or queueing a plurality of data objects of one or more data formats to a programmatically configured annotation processor for performing an automated annotation process.

In some examples, the programmatically configured annotation processor may access at least one data object of a data format that has been queued to the programmatically configured annotation processor. The programmatically configured annotation processor using an orchestrated annotation recognition engine identifies one or more attributes of at least one data object. In an example, the annotation model is generated using an orchestrated annotation recognition engine that is trained (automatically trained) using object data stored in one or more databases of a storage device that is accessible by the programmatically configured annotation processor.

In some examples, the programmatically configured annotation processor may classify one or more attributes of a data object into one or more data sets that may include annotation data and metadata. The programmatically configured annotation processor may generate an annotation model based on a classified data set of the annotation data and the metadata. The programmatically configured annotation processor may combine changes or edits made to the annotation data and metadata of the annotation model based on an annotator's input to improve the accuracy of the labeling of the annotation model. For example, the annotation model's accuracy is enhanced by combining annotation input that is based on knowledge and usage that is industry-specific for a specified industry or is of a common usage industrywide.

In some examples, the computer-implemented method may further include the step of enabling the programmatically configured annotation processor to validate the annotation model based on feedback received by input that is industry-specific to the annotation model application.

In some examples, the computer-implemented method may further include the programmatically configured annotation processor to enable one or more orchestrated solutions for adding or augmenting annotation data and metadata to the annotation model. In some examples, an orchestrated solution may include a generative Artificial Intelligence (AI) solution.

In some examples, the computer-implemented method may further include the programmatically configured annotation processor, enabled to proactively add metadata to the annotation model. For example, the metadata to be added may include labeling data (that is industry-specific) to an annotation model being generated or in current use.

In some examples, the computer-implemented method includes metadata that has been programmatically classified and may include data that is of a common type. The common type of metadata may be considered metadata that is not based on or derived from industry-specific input.

In some examples, the computer-implemented method includes metadata that is not programmatically classified and includes data that is not of the common type. The metadata not of a common type may be considered metadata which is based on or derived from industry-specific input.

In some examples, the computer-implemented method uses labeling data that has been reviewed and/or edited from an entity with industry-specific knowledge. The entity may be an annotator (e.g., reviewer) with knowledge or training in industry-specific terminology and ways of doing business in a particular industry. In some examples, the originating entity may be a generative AI application that is trained for a particular industry. In some examples, the annotator may rely upon the annotator's knowledge and/or may also use other sources' knowledge and expertise. For example, the annotator may query information about labels using online tools during a manual edit or review operation of an annotation model. In an example, the labeling data of the annotation model may be validated based on input(s) that are industry-specific originating from an entity (e.g., annotator) or multiple annotators with industry-specific knowledge.

In some examples, the computer-implemented method may further include the programmatically configured annotation processor applying the annotation model to a filtered set of object data based on a querying input (from an annotator) to generate a query-specific annotation model.

In some examples, the labeling data of the annotation model is reviewed based on industry-specific input and changed in accordance with customary industry practice. In some examples, a computer system includes ingesting, by a processor using at least one orchestrated solution, a plurality of data objects of one or more data formats. Further, identifying by the processor, using an orchestrated annotation recognition engine, one or more attributes of at least one data object. The orchestrated annotation recognition engine may be trained using object data stored in one or more databases of a storage device, or accessible from a cloud-based storage.

In an embodiment, further process steps may involve classifying by the processor, the one or more attributes of at least one data object into one or more data sets that comprise annotation data and metadata. Based on at least a classified data set of the annotation data and the metadata, the processor may generate an annotation model. The annotation model may be further configured by combining changes or edits in annotation data and metadata that have been performed based on industry-specific input from reviewing in a graphical user interface the attributes of the annotation model.

In some examples, one or more non-transitory computer-readable media storing instructions executable by a processor, wherein the instructions, when executed by the processor, cause the processor to perform operations that include ingesting using an orchestrated solution, a plurality of data objects of one or more data formats. Further, the instructions may include identifying using an orchestrated annotation recognition engine, one or more attributes of at least one data object. The orchestrated annotation recognition engine may be trained using object data stored in one or more databases of a storage device. Also, instruction may include classifying one or more attributes of at least one data object into one or more data sets that comprise annotation data and metadata wherein the annotation data is based on the metadata and generated based on a classified data set of the annotation data and the metadata, an annotation model. The annotation model may be further modified or configured by combining changes or edits made to the annotation data and metadata based on input from an annotator with industry-specific knowledge to make changes so the annotation data and metadata used can or may conform better to current industry practice.

In some examples, the operations further include validating the annotation model based on feedback about the annotation model of current industry practice or industry-specific input to ensure the annotation model is consistent or more consistent with terminology used in a specified industry.

In some examples, the operations further include using at least one orchestrated solution for adding or augmenting annotation data and metadata to the annotation model, the orchestrated solution may also include a generative Artificial Intelligence (AI) solution.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

The present disclosure describes techniques to enable a programmatic annotation system that includes a methodology for adding metadata to an unstructured data object or document. The techniques described provide for generating an annotation model by labeling data in accordance with a specific industry. The methodology described implements a hybrid or combination process flow that is partly automated annotations process combined with a manual review and edit process of the annotations to yield a more accurately constructed annotation model that allows for an efficient constructing process. For example, the combined process (1) does or may not require expending significant amounts of labor (e.g., reduce amounts of costly employee labor and time) to construct and maintain the annotation model, and (2) increase the accuracy of an automatically generated annotation model with more precise industry-specific labeling overcoming the drawbacks of less precise automated-based modeling only. In other words, the techniques described herein provide improved results in annotating data objects while combatting the time-consuming aspects of having to construct manually an annotation model for each industry-specific solution. By limiting the amount required of manual construction steps in building the annotation model (e.g., making more efficient manual editing used in a model-generated annotation process) a more accurate annotation model is still achieved by having a process flow that limits or puts constraints on the amount of manual intervention that is needed in generating the annotation model.

In some embodiments, reference is made to object data in a JSON (JavaScript Object Notation) format herein. JSON may be considered or defined as a text-based, human-readable data interchange format used to exchange data between web clients and web servers. The format defines a set of structuring rules for the representation of structured data. JSON can be used as an alternative to Extensible Markup Language (XML). In some situations, it may be desirable to receive an unformatted data set containing unstructured data that is to be formatted as a new structured data set of a target or desired file format. Unstructured data in JSON may be written in name and value pairs, similar to JavaScript object properties. A name and value pair are constructed using a name that is placed in double quotes, followed by a colon and a given value.

In some embodiments, reference is made to ingesting data such as media including documents, views, and audio. Data ingestion may be considered or defined as techniques for importing large, assorted data files from multiple sources into a single storage medium. A data ingestion process may include data imported of different types and schema to a single consistent format in a cloud storage medium. Data quality management may be used for data integration with data ingestion, to increase the performance, usability, and value of the data. Data quality management may include processes directed to data annotation, data validation, data enrichment, and data auditing.

In some embodiments, reference is made to annotation data. Annotation data may be considered or defined as related to metadata and includes data that is created or generated in the process of reviewing, changing, and editing of labeling data (e.g., metadata) available in video, image, or text such as metadata. Annotation data may be considered data that makes references to the metadata itself but is not an actual part of it; for example, data inclusive of notes or edits on the metadata.

In some embodiments, the data annotation model generation process described herein may be implemented by using an AI model that provides an automatically created annotation model. The automatically created annotation model may in turn be further refined by a manual edit/review operational step (e.g., a limited user review operation) to edit or change the data labels and a manual or user validation of the data labels. In other words, by providing a multi-step annotation (e.g., two-step) modeling process of combining predictive and AI algorithmic annotation process with a manual or user process, a more accurate set of labels is configured that can overcome the time-consuming and more costly annotation review process that relies solely on a manual (e.g., user, annotator) annotation model process flow only. A more accurate annotation model is yielded herein with user-specific input that is not overly reliant or may not even have to rely on the model-generating process of input from manual or user annotating being performed by users based on the training of the model that has already been implemented with industry-specific knowledge.

For example, not only can an automated annotation modeling process be used to construct the model, but also by combining steps of the automated annotation modeling process and steps of the following: an additional manual annotation, a validation, and a review step; the result is that a more accurate annotation model is built and a more efficient process is enabled to achieve the enhanced model by a combination of automated model generation and an input to modify the model and review the automatically created metadata of the model where the input is based on industry-specific edits.

In some examples, the metadata applies to common objects and can be both non-specific to an industry, and more specific or very specific to the industry based on user input or an entity's input knowledge. The storing of the metadata as well as newly added metadata may also be made available or be immediately "discoverable" to implement an annotation system that enables collecting data and filtering the data to identify metadata that can be used for enhanced specific industry models. Also, once the data is filtered, one or more users can quickly augment or add to or have automated algorithms (generative AI applications) add data to the corpus of data for a particular business context and port the contextual information back into the metadata for later searchability. The programmatic annotation system is also configured to generate a historical database of generated metadata that allows for the building of a business-specific Artificial Intelligence (AI) solution which then may assist in more quickly allowing the expansion or building of a set of metadata (that is in progress to be constructed) that has been associated with particular documents.

In various embodiments, systems, and methods of the programmatic annotation system apply to end-to-end annotation process management of unstructured data (cloud/SaaS platform) combining manual labeling, review, and validation with automated labeling to the unstructured data set. Also, for reusing the model of the data set created by the manual, review, and validating labeling, and the automated labeling for different AI-specific applications, ingesting very large volumes of unstructured data in multiple different formats for data set modeling at once and applying iterative learning to validated models for enhanced modeling for use within a specific business context.

In various embodiments, systems, and methods provide an annotation model with industry-specific industry input that may be implemented in a data ingestion or data integration process for ingesting or integrating batches of data that are in different formations including structured and unstructured formats.

In various embodiments, systems, and methods provide enablement of a cloud-based platform for data ingestion and data management that allow for manual and generative AI modeling.

Figure 1:
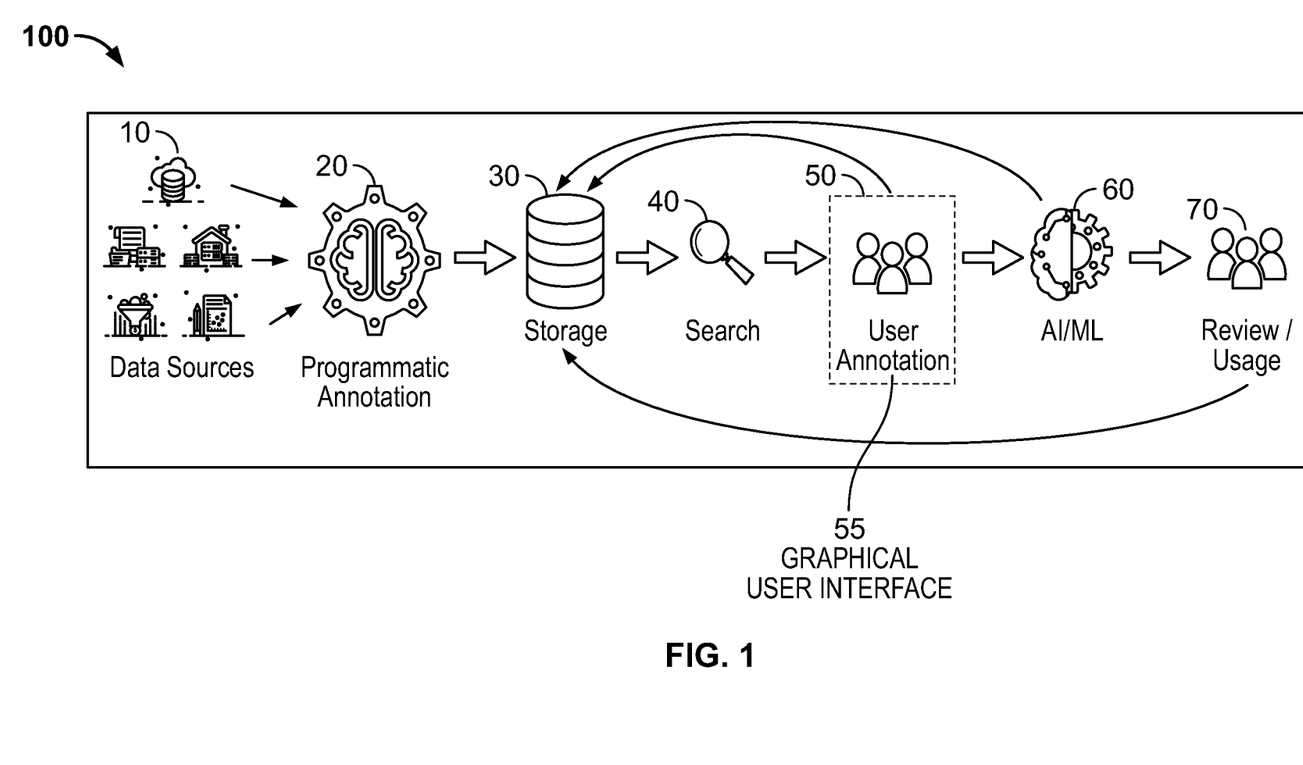
FIG. 1 shows a diagram of a smart annotation system that includes data sources that send unstructured data sets for receipt by a programmatic annotation module (e.g., a programmatic annotation processor) according to some embodiments.

FIG. 1 shows a diagram of a smart annotation system 100 that includes data sources 10 that send unstructured data sets for receipt by a programmatic annotation module (e.g., a programmatic annotation processor) 20 according to some embodiments. The data sources 10 may be orchestrated and queued to enable the ingesting of data objects to the programmatic annotation module 20. In some embodiments, an ETL (extract, transform, and load) service may be added to simplify the process of cleaning and normalizing the data. The programmatic annotation module 20 sends one or more unstructured (or structured) data objects and/or data sets for storage in a database in a storage device 30. The storage device 30 may be configured with one or more databases (or a multi-tenant access database configuration accessible across multiple different platforms) for storing different annotated models for use with industry-specific queries, and annotated data and metadata for use in training various components and engines of the smart annotation system 100.

The search application 40 is configured to connect to the storage device 30 for performing a query operation of the data sets and/or data objects contained in the storage device 30 for implementing industry-specific or query-specific annotation models. The output of a set of results or configured subset of data is sent to an application that can include a graphical user interface that allows for input of user (manual) annotation 50 of the metadata associated with the data set. The output of the metadata review from the user annotation 50 is sent to construct an AI/ML model 60 (e.g., an annotation model). Once constructed, the model (e.g., annotation model) 60 is validated by review 70 (e.g., annotator with industry-specific know-how providing user input) of its output. In some embodiments, the annotation model may be considered a model that is built and consists of annotation data and metadata.

The review may include inputting changes, edits, and additional metadata such as labeling of data sets associated with the model 60. The review can be a manual or user review by an entity that has industry-specific knowledge to increase the accuracy of the metadata used in model 60. The programmatic annotation module 20 may include components such as a recognition engine, classifier, and selectable cognitive solutions that can be trained using object data stored in one or more databases of the storage 30.

The training can be based on supervised (and unsupervised) training of data sets that are outputted from model 60, and the supervised training can be based on feedback input that is received by user input such as industry-specific input from an entity or originator with industry-specific knowledge. The training can be extended to one or more components of the system. For example, the classifier of the programmatic annotation module 20 may be configured as a neural network in which a first layer of nodes is trained using metadata, and a second layer of nodes is trained using annotation data. In some embodiments, model 60 is a predictive model that can be used to recognize one or more different sets of attributes that are likely seen in data objects of particular groups of documents identified by header or other identifying information.

The entity with industry-specific knowledge may include a user such as an employee of the corporation, or a single or a group of users (not affiliated) that have been trained with knowledge of specific industries. In some embodiments, the entity with industry-specific knowledge may be a generative Artificial Intelligence (AI) application or algorithm that has been trained with industry-specific knowledge, etc. Also, industry-specific knowledge may be gained from historical data sets of models stored in the databases of the storage 30 using intelligent algorithms.

In some embodiments, at input from one or more of the data sources 10, documents are ingested by uploading files or archives containing multiple documents that contain unstructured data to the programmatic annotation module 20. The documents may be ingested through one or more different Application Programming Interfaces (APIs). The ingesting may also involve converting object data to a more unified format for further processing and storing, and for normalizing with the other data objects received. Once ingested, the programmatic annotation module 20 is configured to receive queued data objects from the input that contains voluminous amounts of unstructured data from multiple different sources to extract the data objects and apply orchestrated solutions for automated programmatic annotation to the data objects received.

In some embodiments, the smart annotation system 100 may receive large amounts of data from multiple different lines of business sources (that in some cases are industry-specific) that can consist of volumes of data objects received daily or periodically and are queued to a programmatic annotation module 20. In some examples, the unstructured data that is received may include documents, images, audio, and video that may consist of different levels of unstructured formatted data that are ingested and stored by the programmatic annotation module 20 and sent to databases at a platform repository (S3) (the storage 30) in a data set type account. For efficiency, during the object ingest stage (e.g., the ingesting of the unstructured data from the plurality of data sources 10), the objects are automatically processed in the programmatic annotation module 20 by applying various orchestrated open-source data processing solutions for object recognition, feature or attribute detection, and insight generation.

In some embodiments, the model 60 that is constructed can be applied to generate a plurality of insights from the data object, and the object data and insights may be collated or classified by a classifier of the programmatic annotation module 20 to enable response to search and retrieval of annotated data, metadata, and annotation models stored in the databases of the storage device 30.

In some embodiments, the search application 40 can be configured as a search mechanism that is or is not industry-specific using the automated labeling (generated automatically by the programmatic annotation module 20) an index of the data is created for search and retrieval that allows for efficient searching of the unstructured data in a JSON format.

In some embodiments, the smart annotation model 60 that is configured may consist of a framework with custom-specific models that are derived from metadata of labels and annotations submitted manually by the user annotation 50. The custom-specific models may be stored in the storage 30 which can be a centralized database that may be requested for industry-specific labeling which is then associated with the original data ingested. The use of manual (expert know-how) is indirectly combined and scaled in the smart labeling modeling and augmented with prior labeling and annotation modeled in the central database (storage 30). This allows for better industry-specific reusable models that can be recycled and refined iteratively (each cycle) for the annotation and labeling of the unstructured data.

In some embodiments, the smart annotation model 60 is configured by using a two-stage training self-supervised learning process where the learning is first based on the unstructured unannotated data, and then a second step of manual annotation is enabled (user annotation 50) to refine (further correct) the model. In some embodiments, the automated annotation at the first stage may employ programs such as CHATGPT® and GOOGLE BARD® for generating metadata (using generative AI algorithms) such as labeling documents. For example, these products combined with Natural Language Processing (NLP) applications may be used to ingest documents and analyze the documents to generate an ontology for use in labels of one or more data objects attributes or features detected.

In some embodiments, a Graphical User Interface (GUI) 55 (shown in more detail in an exemplary GUI in FIG. 6) may be used with or to aid the user annotation 50 that allows one or more users with industry-specific knowledge to add edits or add labels to the metadata to construct an enhanced model 50 while visualizing the annotation model. The GUI 55 is configured in a manner that allows users with industry-specific knowledge that are downstream of the automated labeling and annotation process flow, to revisit automated labels and annotation performed, view and correct the labels manually by selection, and act as a manual quality control. Also, the further editing that has been captured in the model provides for training the model for better accuracy based on the user edits and the industry-specific user input.

Figure 2:
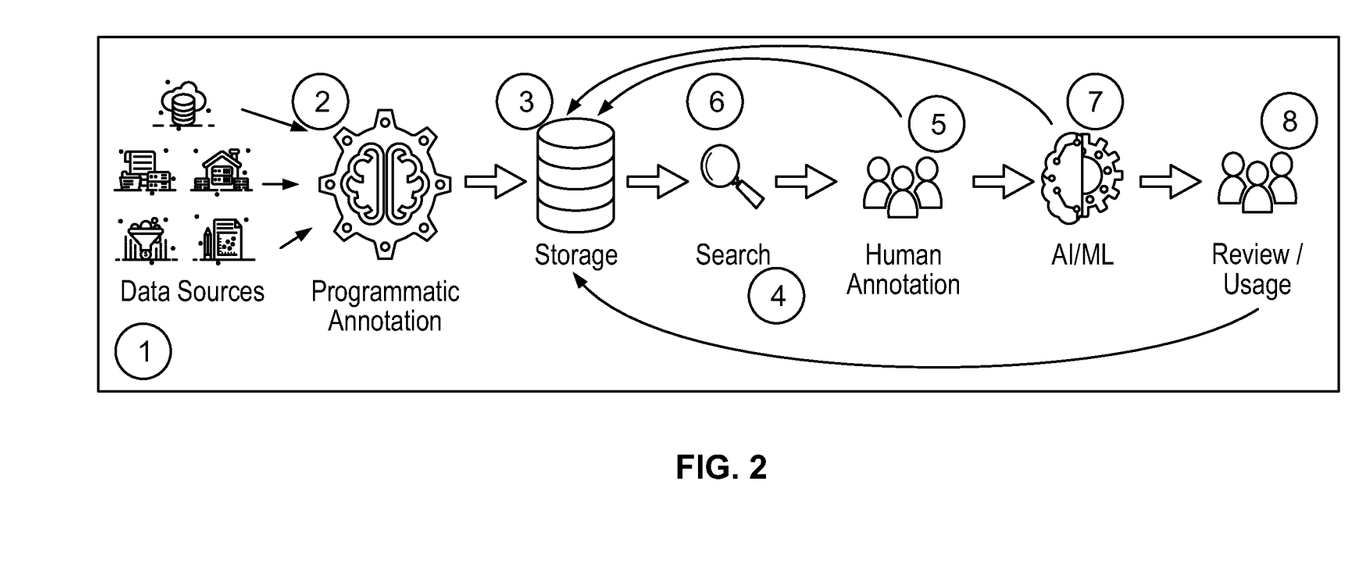
FIG. 2 shows an example process diagram of the smart programmatic annotation system according to some embodiments.

FIG. 2 shows an example process diagram of the smart programmatic annotation system according to some embodiments. In FIG. 2, the smart annotation system 100 includes process steps 1 to 8 from an input of data objects received from a plurality of data sources to the application of the smart model outputted. At the cognitive solutions execution at an initial process step 1, multiple data sources (e.g., document, video, media sources) 10 are operatively communicatively coupled to the smart programmatic module 20 and each source may represent one or more lines of business of the industry-specific operations of a corporate entity. As an example, the corporate entity can be an insurance company with multiple lines of business that include property and casualty insurance, life insurance, auto and fire underwriting, and enterprise customer communications. The volume of data that is ingested can be in an order of several million data objects and may consist of documents, images, audio, and video. The data objects that are ingested are stored in a cloud repository or may be locally stored on a server, desktop device, or a combination of these.

In some examples, the unstructured data can be composed or formed of a variety of different unstructured type formats for conversion to a desired structured file storage data format. For example, an input file that is uploaded may include a JSON object (i.e., file format) composed of unstructured data that is sent for storage and for fetching from the storage of an object storage platform. In some embodiments, the object storage platform is configured to store the input file which may include one or more unstructured data objects and may be configured to enable linking to multiple APIs or libraries to provision (or to perform other processes) and also make more efficient, the processing by the smart annotation system 100 of the unstructured data (i.e., JSON object data) contained in the input file or other files of unstructured data types.

In some embodiments, the object storage platform may be a cloud-type platform that is located at a remote enterprise network that allows the smart annotation system 100 to call multiple APIs or linked libraries installed at the object storage platform for use in initially provisioning and processing of a JSON object or other unstructured data object.

At process step 2, in response to data objects being ingested, the data objects are further processed for additional insights through third-party out-of-the-box solutions. In some embodiments, an AMAZON® object storage platform such as AMAZON® S3 may be used to store one or more data objects such as the JSON object that contains the unstructured data and may also be linked to one or more APIs (or other open-source applications) that may be also configured at the object storage platform. As an example, the example smart annotation system 100 may be configured to execute one or more scripts for processing the data object that has been ingested at the object storage platform for object storage.

In implementation, one or more open-source applications (or APIs) may be initialized and executed during an onboarding or ingesting stage for uploading the documents from the various business lines. Also, one or more libraries may be linked in the object storage platform (i.e., a third-party platform) with other applications and/or APIs to process the unstructured object data of the JSON object of one or more input files.

For example, a set of libraries may be imported with the object storage platform to define a context for the JSON object on the object storage platform and to configure a set of variables used in defining parts of the JSON object. In some instances, multiple parts or sub-objects may be defined of the JSON object composed of the unstructured data and each sub-object may have one or more attributes that are used to create a structure for the data of the JSON object (i.e., to create a structure type with attributes for each data object). For example, a structure type may be used to store structured data in CSV files at the output in a configured output file.

In some embodiments, out-of-box solutions (e.g., a set of libraries) may include optical character recognition applications, recognition applications for object and scene detection, and transcribing speech-to-text. The data object may contain a machine-readable JSON output associating real insights to the data objects. The low-code/no-code solutions are integrated with the data object management system that is described in FIG. 3.

At process step 3, the insights derived from the original data objects are stored in the JSON output and stored in storage device 30 (which may be a cloud storage or multi-12 tenant storage database) with the original data object ingested. In some embodiments, the objects may be retrieved using an object key (Doc/GUID) which is retrievable through the search mechanism that is described in FIG. 4.

Figure 5:
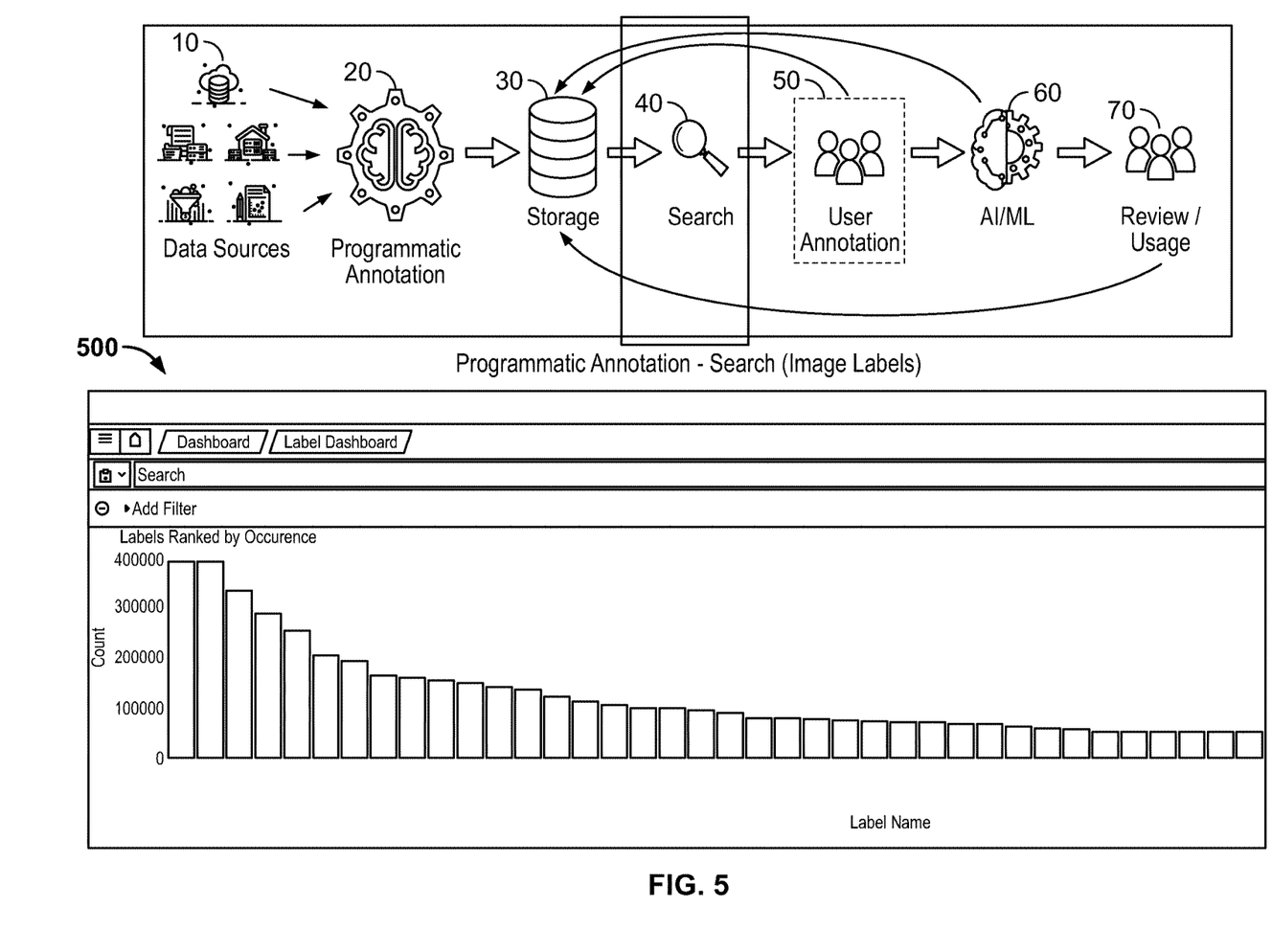
FIG. 5 shows a diagram of a chart of search results of labels detected by the smart annotation system according to some embodiments.

At process step 4, the search mechanism (search application 40) is implemented to leverage the out-of-box solution on a platform which is further described in FIG. 5. The search mechanism is implemented with one or more out-box solutions that are used to generate labels and annotations proactively and programmatically. The labels and annotations are generated for a selected group of data objects from a user-generated query from the search application or mechanism implemented. For example, the search application or mechanism can generate a JSON object file using various search and discovery interfaces.

At process step 5, a user review process may occur to refine the automated annotation that has occurred. For example, using a graphical user interface of a smart annotation framework, a user may manually edit or generate annotations. The user who performs the annotation would be a select group of users that have in-depth or at least some industry-specific expertise and prior knowledge, and this knowledge via a user annotation window can be realized for making edits and generating annotation to the raw JSON object file. Further, by user selection, the user (annotator) can implement various tools on a trial-by-error process to improve the manual annotation that occurs. In this way, the user can add training data, which trains the annotation model that is being used.

In some embodiments, the user may receive an automated model that contains labeling that is machine-generated as input to the graphical user interface. The user may train the machine-learned model or may add a set of annotation data changes to the model. For example, the training may involve reviewing and editing selective labeling of JSON objects such as text objects that are industry-specific. In this way, the user can configure and train the metadata used in an ML model (e.g., the annotation model).

The user may also select prior models and combine prior models used as a current model to perform the annotation. The user may initiate third-party services such as OPENAI® CHATGPT or GOOGLE® BARD to generate labels for annotating selected object files. In other words, by using both an automated annotation modeling service and a manual service combined with selected tools, the model can be customized to meet particular business needs. In implementation, the annotation process At process step 6, the annotations made by the user (e.g., annotator) are captured in the constructed (e.g., user-trained ML model) model and stored in a database of the storage device 30. For example, the manually annotated labels of images with constructed models with specified attributes added are stored at a centrally configured storage (e.g., the storage device 30) for retrieval and reuse. Also, metadata associated with the constructed model by the manual annotator may be stored and used in training other annotators for enhancement in consistency in the annotation process. The captured annotations may be also presented in a graphical user display for selection by an annotator for like objects that require annotation. In this way, consistency in the annotation process flow is enhanced as well as increases in domain expertise of the annotator. Also, allowing other domain expert annotators to review the annotations of fellow domain expert's annotations and labeling, may allow for increases in accuracy of models as errors may be manually caught by the other annotators.

At process step 7, as the models are deployed in production, new annotations and labels may be deployed centrally for accessibility of other annotators and use of the models. The annotations may be associated with an original data object and the labels and annotations can be later retrieved for search and discovery, modeling monitoring, and other like processes.

At process step 8, using AI techniques, such as OPENAI CHATGPT® and GOOGLE® GEMINI, the labeling and annotations may be enhanced with new content automatically created by generative learning based on newer models stored in a database of the central storage (the storage device 30). As an example, a generative AI model may be automatically created producing augmented labels and annotations learned based on representations of labels and annotations of internally stored models.

Figure 3:
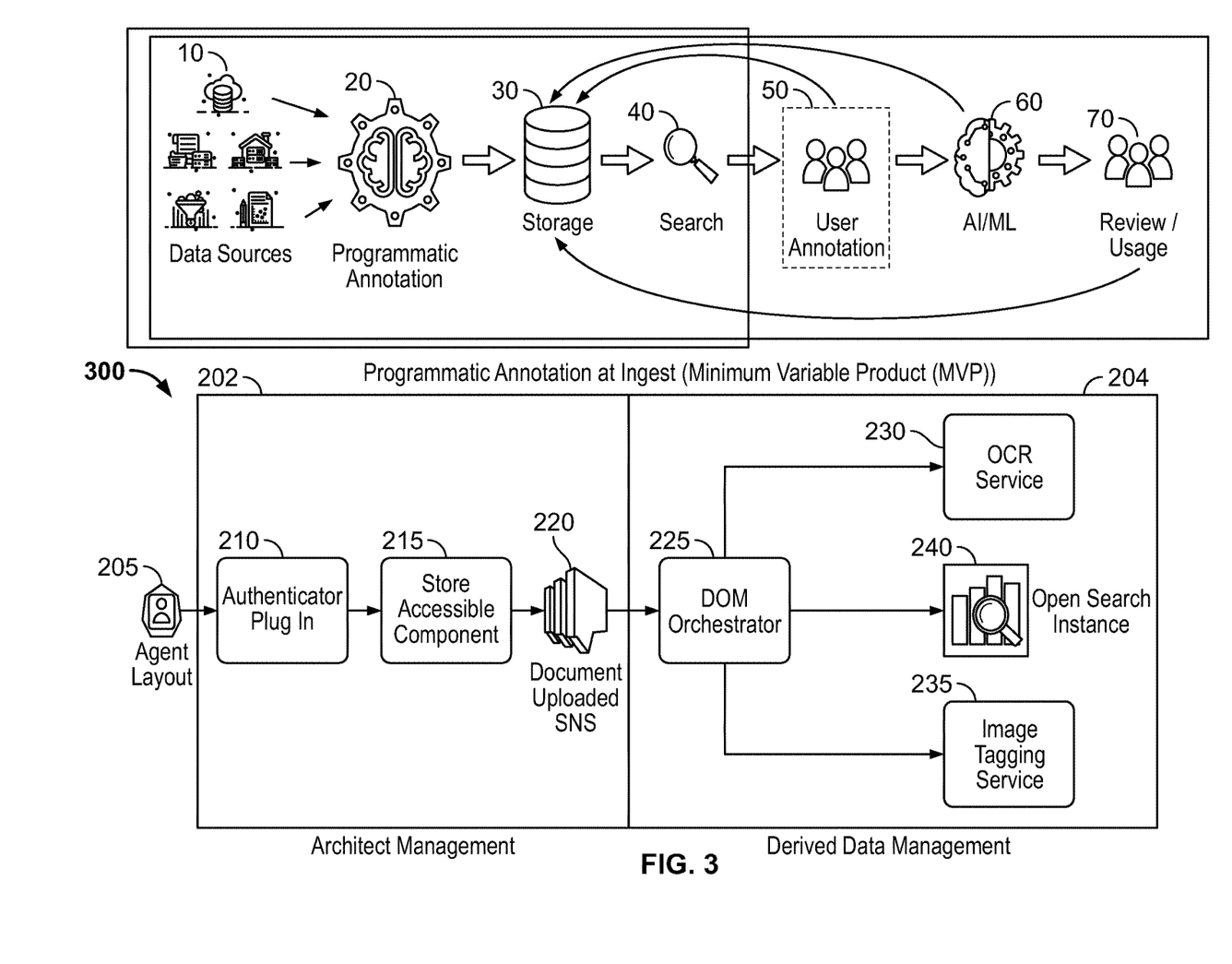
FIG. 3 shows a diagram of a programmatic annotation flow at data ingestion by the programmatic annotation system according to some embodiments.

FIG. 3 shows a diagram of a programmatic annotation flow 300 of data ingestion by the programmatic annotation system according to some embodiments. In FIG. 3, aspects of the input from the multiple data sources 10 to the smart programmatic module 20 to the storage device 30 and the search application 40 of FIG. 1 are shown in greater detail and include the components of an uploading agent, an artifact manager that authenticates data objects, a store accessible component that retrieves different API and funnels data objects to an open search instance. In some examples, a data management process of ingesting data from multiple sources and reformatting the data during the uploading to a single format for further processing is shown. For example, FIG. 3 depicts the document processing for ingesting a high volume of data objects in a single ingest flow, and the automated approach to programmatically annotate one or more data objects at the ingest input (from an agent 205) by the smart programmatic module 20 or at a later stage after the data object is reformatted into a default or uniform format. In the smart programmatic module 20, in the artifact management process 202, the data object (e.g., the JSON object) is processed for file conversion and data validation. In the flow, module 210 may be configured to authenticate the data object and determine which data objects to accept or delete. The flow can include a plugin such as module 210 configured as an authentication plugin, a store API plugin such as module 215, and an uploading module 220 that generates a JSON object with an identifier at the output to a document management process 204.

The document management process 204 of the smart programmatic module 20 and storage device 30 can include an open search instance 240 to be used for search and discovery processes and filtering. The document management process 204 may include an input of a JSON object to an orchestrator 225 that sends outputs to various services such as an OCR service 230, and image tagging service 235. The JSON object is received by the open source which is a distributed NoSQL as an example (but also SQL databases may be used) and managed datastore on a third-party platform. For example, the storing to the storage device 30 may include the execution of file conversion applications that execute one or more processing scripts to convert the JSON object file to a data frame. The processing script of the file conversion application may convert the data of the JSON object into a dynamic frame for a more structured and relationship-based representation of the unstructured data contained in the JSON object. In some embodiments, the unstructured data of the JSON object may be processed by the attribute analyzer that includes code, for example, Python code (or other open-source code) that uses the APACHE® Spark framework to process and analyze one or more JSON input attributes of the JSON object data.

In some embodiments, once the flow generates the JSON object, and it is ingested to the open search instance 240, an original unique identifier is created to associate with the JSON output of the orchestrated out-of-the-box services allowing a user to easily locate data objects stored in the storage device 30 without having to review a mass amount of data.

Figure 4:
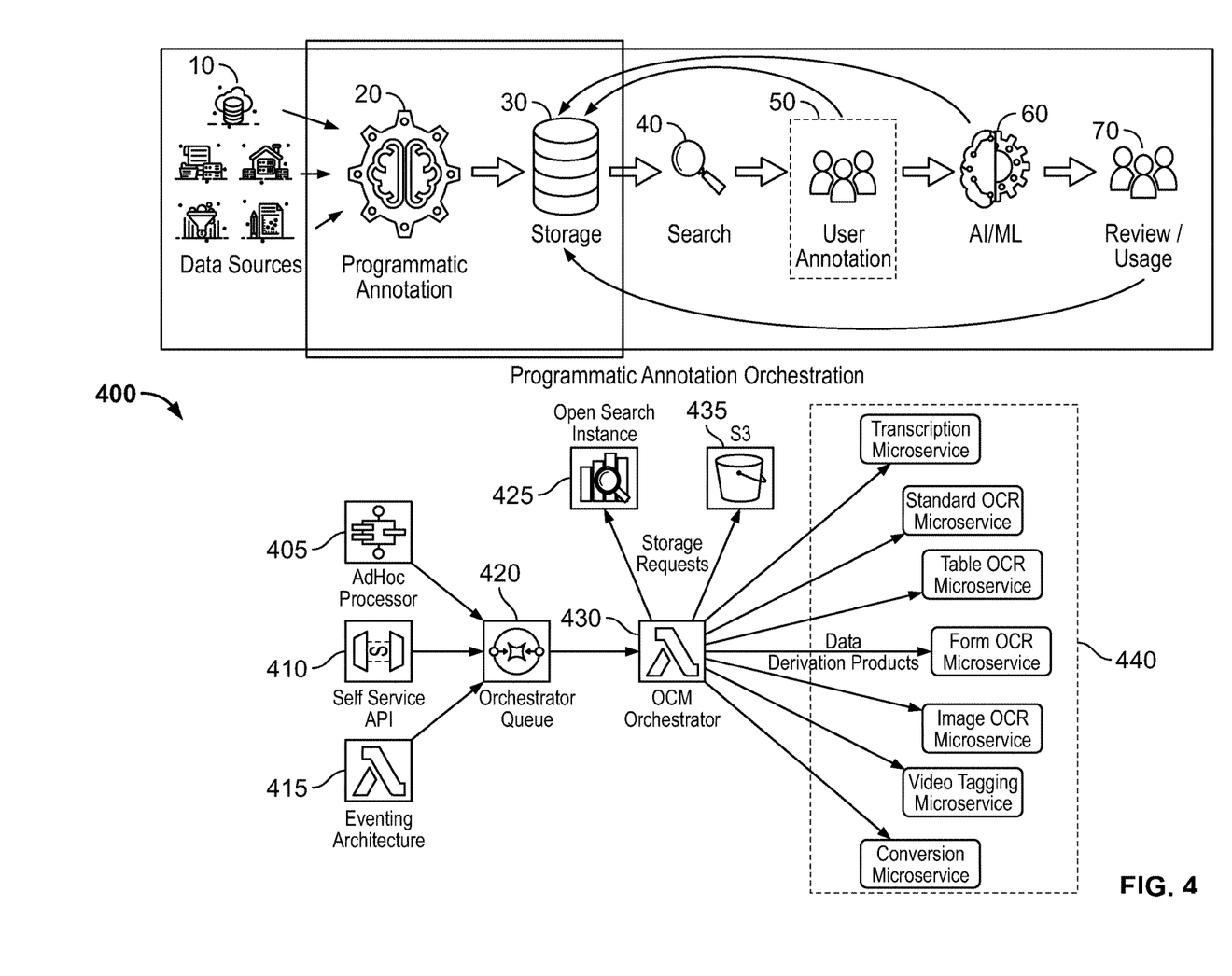
FIG. 4 shows a diagram of a programmatic annotation orchestration flow of the programmatic annotation system according to some embodiments.

FIG. 4 shows a diagram of a programmatic annotation orchestration flow 400 of the programmatic annotation system according to some embodiments. FIG. 4 describes aspects of the output of the smart programmatic module 20 to the storage device 30 of FIG. 1 is shown in greater detail and includes the components of the orchestrator with multiple services. FIG. 4 shows the orchestration of individual out-of-the-box solutions that are used to generate labels and annotations proactively and programmatically. The input to the orchestrator may be invoked by a number of options (that may invoke the service) including an event caused 415, through a self-service API 410, and ad hoc processor 405 for analytical needs.

The JSON object may be processed by an orchestrator queue 420 for a single input channel to the orchestrator 430 for sending to an open search instance 425, storing in an S3 bucket 435, and using microservices 440. Outputs from the microservices 440 may be stored in the s3 bucket 435 as an original file while data labels and other specifics from the out-of-box services (the microservices 440) may be ingested to the open search instance 425 for filtering. Once the labels of interest are located in the original object, the particular label can be identified for use in model training data.

FIG. 5 shows a diagram of a chart of search results of labels detected by the smart annotation system according to some embodiments. FIG. 5 depicts a bar chart 500 of search results of labels detected in data objects ingested through the processes described in FIG. 2. The open search instance 425 of FIG. 4 may be used to locate conditions (e.g., by applying a recognition engine) such as labels, confidence scores, scenes, and phrases in the text of interest to a model training session where the original data objects may be used for the training data. In some embodiments, the search and discovery interface can use a set of labels and annotations as shown in the bar chart 500.

Figure 6:
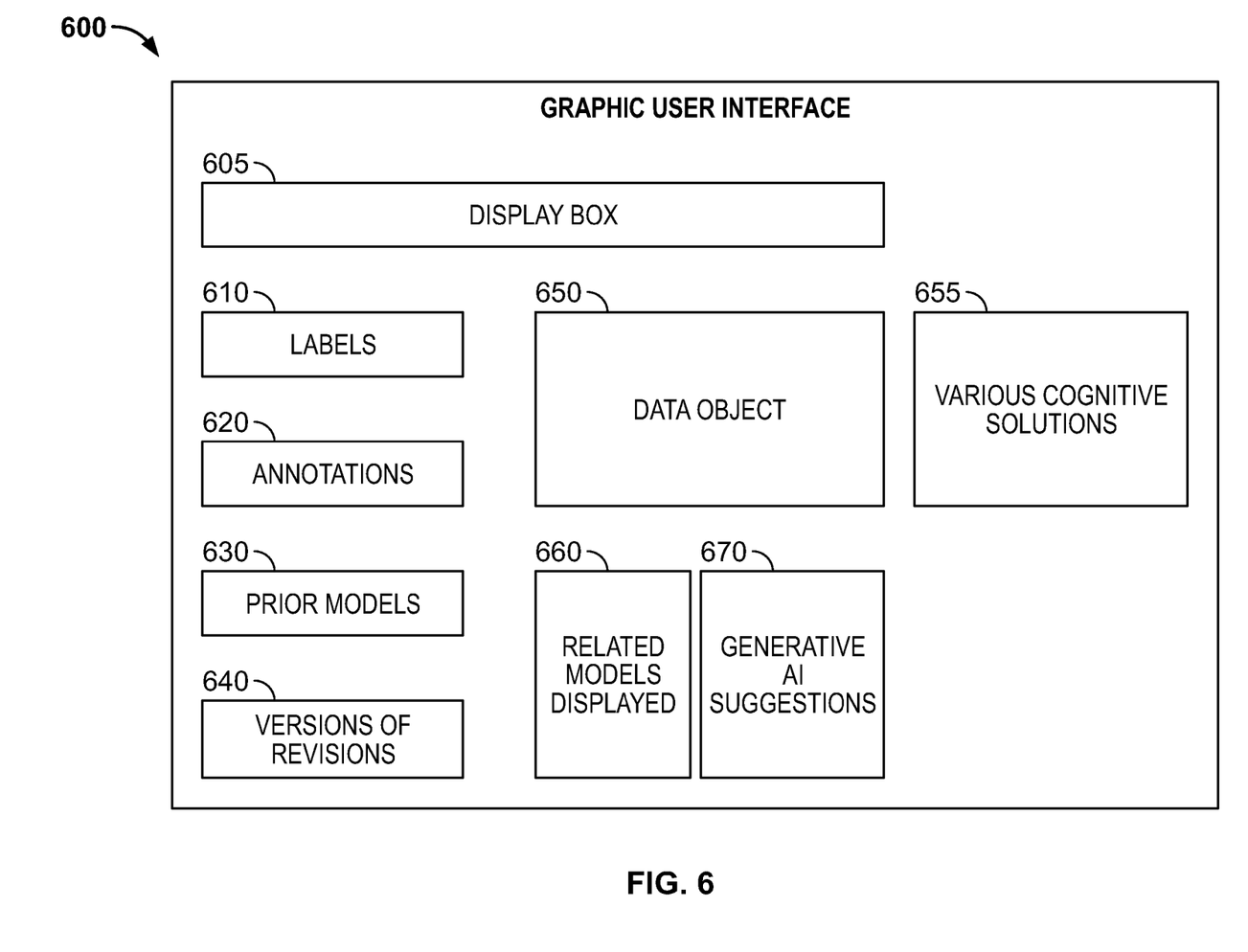
FIG. 6 shows a diagram of a graphical user interface (GUI) that may be used for user review and manual editing of labels and annotation of a data object according to some embodiments.

FIG. 6 shows a diagram of a graphical user interface (GUI) that may be used for user review and manual editing of labels and annotation of a data object according to some embodiments. In FIG. 6, the GUI 600 may be used for manual editing of labels and annotations associated with a data object or an automated generated model. In some embodiments, the GUI 600 may enable a user such as an annotator to revisit automated labels and annotation generated, correct the labels manually by selection, act as a manual quality control, and train the model for accuracy. The GUI 605 may be configured to be hosted locally or cloud-based and configured for display on a mobile device or a desktop. The GUI 605 may include a dialog box of the GUI 605 for manual input of a search query to find a particular data object or industry-specific set of data objects. The GUI 600 may include other features such as presentations of labels 610, annotation data 620, constructed (historical) models 630, revisions or edits to models 640, the related model constructed 660, generative AI tools and suggestions 670, data objects 650, and microservices and other programmatic tools 655.

Figure 7:
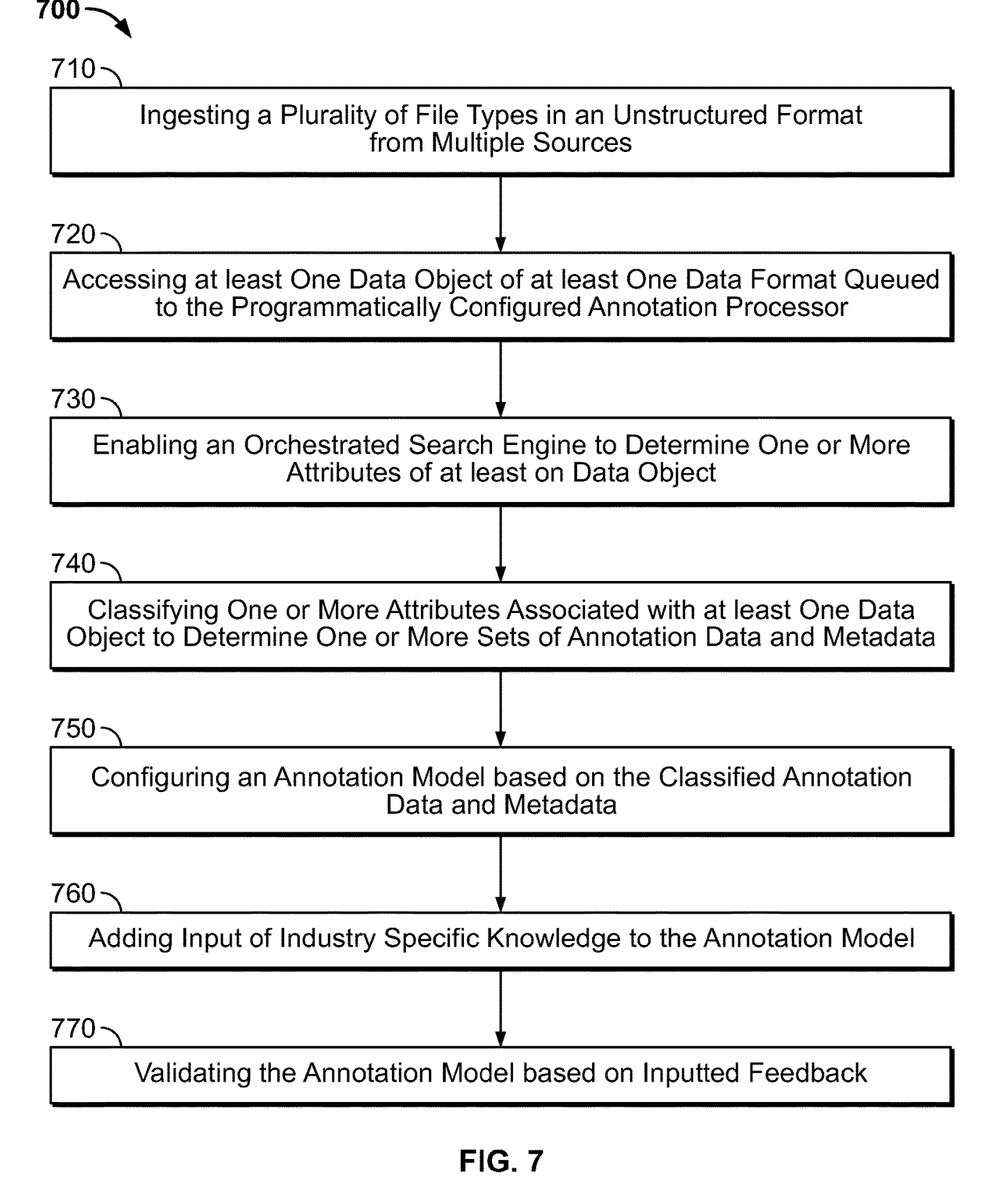
FIG. 7 shows a flowchart of an example method for enabling the smart annotation system of FIGS. 1-2 according to some embodiments.

FIG. 7 shows a flowchart of an example method for enabling the smart annotation system 100 of FIGS. 1-2 according to some embodiments. In FIG. 7, in flowchart 700, at step 710, the smart annotation system is programmatically configured to initiate ingesting of the data objects of a plurality of file types in an unstructured format from multiple sources. The data objects are ingested by a processor (e.g., an annotation processor) of the programmatic annotation module using one or more orchestrated cognitive solutions. At step 720, the programmatically configured annotation processor is configured to access at least one data object of at least one data format queued to the programmatically configured annotation processor. At step 730, the programmatically configured annotation processor may enable an orchestrated annotation recognition engine (i.e., apply recognition services) at the open search instance to determine one or more attributes of at least one data object.

The orchestrated annotation recognition engine may be trained using object data stored in one or more databases of a storage device that is accessible by the programmatically configured annotation processor. At step 740, the programmatically configured annotation processor may apply a classifier for classifying one or more attributes associated with at least one data object to determine one or more sets of annotation data and metadata. At step 750, the programmatically configured annotation processor based on the classified data set of the annotation data and the metadata configures an annotation model. At step 760, the programmatically configured annotation processor may configure the annotation model by combining edits, revisions, additions, and/or changes of the annotation data and metadata based on user input which is industry-specific from a user that has industry-specific knowledge. This enables the capture of industry-specific knowledge data with data of a common type. At step 770, the programmatically configured annotation process validates the annotation model based on feedback inputted by a user with industry-specific knowledge.

Figure 8:
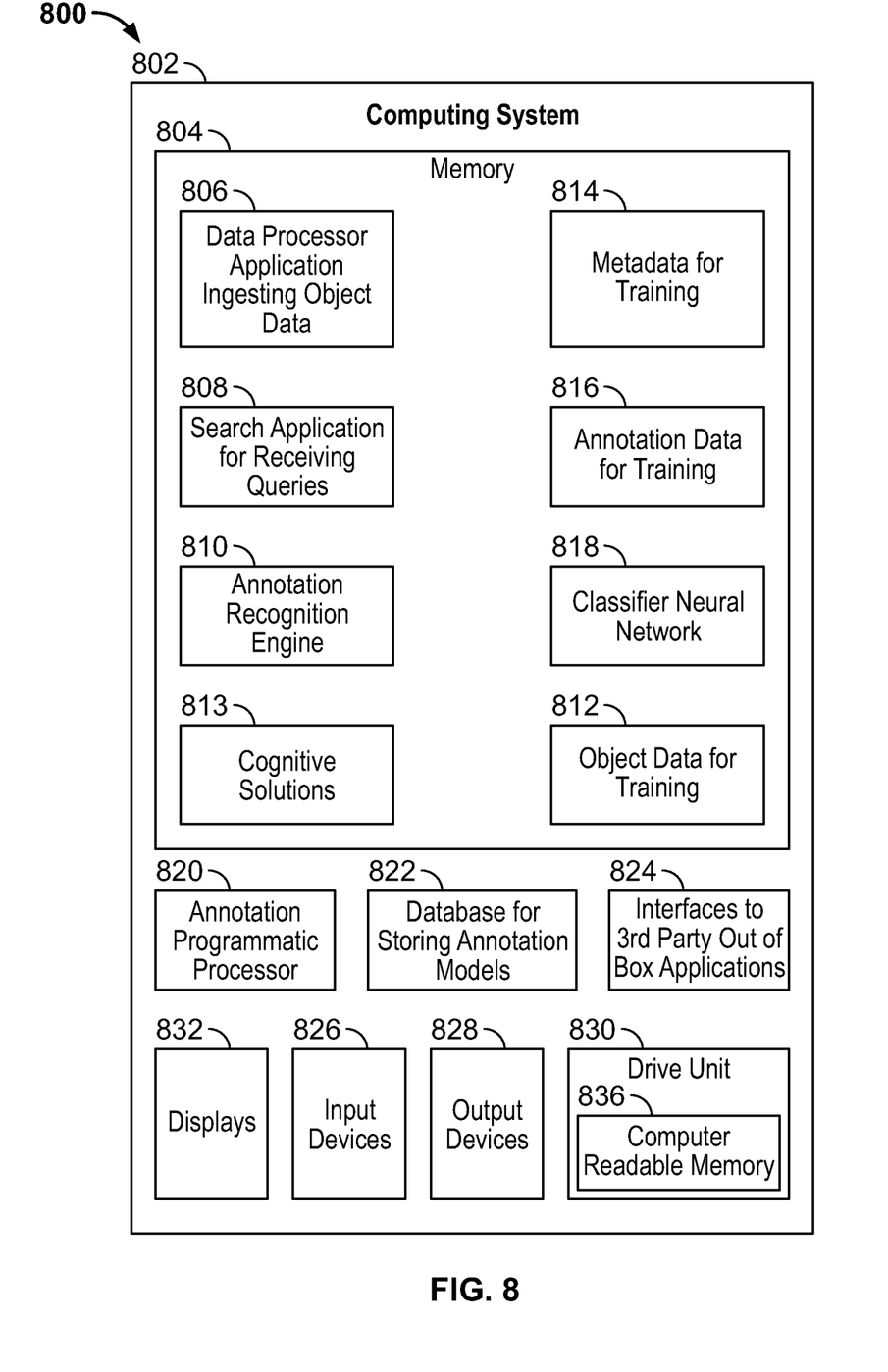
FIG. 8 shows an example system architecture for a computing system that includes the smart annotation system that can execute one or more elements of the programmatic annotation module described herein.

FIG. 8 shows an example system architecture 800 for a computing system 802 that includes the smart annotation system 100 that can execute one or more elements of the programmatic annotation module 20 described herein. The computing system 802 can include one or more servers, computers, computing systems, or other types of computing devices that execute one or more portions of the programmatic annotation module 20 configured with a memory 804 and an annotation programmatic processor 820 that accesses a database for storing one or more annotation models 822 and also accesses one or more applications or data sets including a data processor application 806 for ingesting object data, cognitive solutions 813 for use in ingesting the object data, a search application 808 for filtering and discovery, and an annotation recognition engine 810 for recognizing one or more attributes of a data object. Also, the memory 804 may hold metadata 814, annotation data 816, and object data 812 for use in training various elements such as the annotation recognition engine 810, and classifier 818.

Individual computing devices of the computing system 802 may have the system architecture 800 shown in FIG. 8 or a similar system architecture.

In some examples, one or more elements of the annotation recognition engine 810 can be executed by one or more elements of a cloud computing environment or other distributed system, such as a cloud computing environment that hosts and/or executes one or more elements associated with cognitive solutions or annotation models and/or other elements described herein.

The computing system 802 can include memory 804. In various examples, the memory 804 can include system memory, which may be volatile (such as RAM), non-volatile (such as ROM, flash memory, etc.), or some combination of the two. The Memory 804 can further include non-transitory computer-readable media, such as volatile and nonvolatile, removable and non-removable media implemented in any method or technology for storage of information, such as computer-readable instructions, data structures, program modules, or other data. System memory, removable storage, and non-removable storage are all examples of non-transitory computer-readable media. Examples of non-transitory computer-readable media include but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other non-transitory medium which can be used to store desired information and which can be accessed by the computing system 802 associated with the annotation programmatic processor 820. Any non-transitory computer-readable media 836 and drive unit 830 may be part of the computing system 802.

The memory 804 can store modules and data. The modules and data can include data and/or software or firmware elements, such as data and/or computer-readable instructions that are executable by one or more processors (e.g., the annotation programmatic processor 820). For example, memory 804 can store computer-executable instructions and data associated with the annotation recognition engine 810, such as data and/or computer-executable instructions associated with the data processor application 806, search application 808, cognitive solutions 813, classifier 818, training annotation data and metadata, the configuration data, and/or other elements described herein. The memory 804 can also store other modules and data, such as any other modules and/or data that can be utilized by the computing system 802 to perform or enable performing any action taken by the computing system 802. Such other modules and data can include a platform, operating system, and applications, and data utilized by the platform, operating system, and applications.

The computing system 802 can also have a processor(s) such as an annotation programmatic processor 820, communication interfaces 824 with third-party out-of-the-box solutions as an example, a display 832, output devices 828, input devices 826, and/or a drive unit 830 including a non-transitory machine-readable medium 836.

In various examples, the annotation programmatic processor 820 can be one or more processors of a central processing unit (CPU), a graphics processing unit (GPU), both a CPU and a GPU, or any other type of processing unit. Each of the one or more processor(s) may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) may also be responsible for executing computer applications stored in memory 804, which can be associated with common types of volatile (RAM) and/or nonvolatile (ROM) memory.

The communication interfaces 824 can include transceivers, modems, interfaces, antennas, telephone connections, and/or other components that can transmit and/or receive data over networks, telephone lines, or other connections. In some examples, the communication interfaces 824 can be used by the annotation programmatic processor to locate and/or retrieve 3$^{rd}$ party out of box applications, apply cognitive solutions 813 to ingested files, transmit analytics, or otherwise send and/or receive data.

The display 832 can be a liquid crystal display, or any other type of display commonly used in computing devices. For example, a display 832 may be a touch-sensitive display screen and can then also function as an input device or keypad, such as for providing a soft-key keyboard, navigation buttons, or any other type of input.

The output devices 828 can include any sort of output devices known in the art, such as the display 832, speakers, a vibrating mechanism, and/or a tactile feedback mechanism. Output devices 828 can also include ports for one or more peripheral devices, such as headphones, peripheral speakers, and/or a peripheral display.

The input devices 826 can include any sort of input devices known in the art. For example, input devices 826 can include a microphone, a keyboard/keypad, and/or a touch-sensitive display, such as the touch-sensitive display screen described above. A keyboard/keypad can be a push button numeric dialing pad, a multi-key keyboard, or one or more other types of keys or buttons, and can also include a joystick-like controller, designated navigation buttons, or any other type of input mechanism.

The machine-readable medium of the drive unit 830 can store one or more sets of instructions, such as software or firmware, which embody any one or more of the methodologies or functions described herein. The instructions can also reside, completely or at least partially, within the memory 804, annotation programmatic processor 820, and/or communication interfaces 824 during execution thereof by the computing system 802. The memory 804 and the annotation programmatic processor 820 also can constitute machine-readable media.

Although the subject matter has been described in language specific to structural features and/or methodological acts, it is to be understood that the subject matter is not necessarily limited to the specific features or acts described above. Rather, the specific features and acts described above are disclosed as example embodiments.

What is claimed is:

1. A computer-implemented method, comprising:
   ingesting, by a computing system comprising a processor, and from a plurality of data sources, a plurality of data objects that comprise unstructured data;
   determining, by the computing system, and by executing an annotation recognition engine configured to process the unstructured data of the plurality of data objects without user input, respective attributes of the plurality of data objects;
   adding, by the computing system, and via the annotation recognition engine, labeling data to the plurality of data objects, wherein:
      the labeling data comprises at least one of annotation data or metadata corresponding to the respective attributes of the plurality of data objects;
   generating, by the computing system, a machine learning model based on the labeling data added by the annotation recognition engine to the plurality of data objects; and
   configuring, by the computing system, the machine learning model based on additional labeling data indicated by input received via a user interface.

2. The computer-implemented method of claim 1, further comprising validating, by the computing system, the machine learning model based on industry-specific feedback.

3. The computer-implemented method of claim 1, wherein the annotation recognition engine comprises a generative Artificial Intelligence (AI) solution that is configured to process the unstructured data to identify the respective attributes and to add the labeling data.

4. The computer-implemented method of claim 1, wherein the labeling data added by the annotation recognition engine is associated with data of a common and non-industry-specific type.

5. The computer-implemented method of claim 4, wherein the additional labeling data indicated by the user input is associated with industry data, specific to a particular industry, that is different than the data of the common and non-industry-specific type.

6. The computer-implemented method of claim 1, wherein:
   the user interface is configured to display the labeling data added to the plurality of data objects by the annotation recognition engine, and
   the input, received via the user interface, confirms or edits the labeling data added by the annotation recognition engine.

7. The computer-implemented method of claim 1, further comprising:
   identifying, by the computing system, a filtered set of object data based on a querying input, and
   generating, by the computing system, a second query-specific machine learning model based on the filtered set of object data.

8. A computer system, comprising:
   one or more processors; and
   one or more non-transitory computer-readable media storing computer-executable instructions that, when executed by the one or more processors, programmatically configure the one or more processors to perform operations comprising:
      ingesting, from a plurality of data sources, a plurality of data objects that comprise unstructured data;
      determining, by executing an annotation recognition engine configured to process the unstructured data of the plurality of data objects without user input, respective attributes of the plurality of data objects;
      adding, via the annotation recognition engine, labeling data to the plurality of data objects, wherein:
         the labeling data comprises at least one of annotation data or metadata corresponding to the respective attributes of the plurality of data objects;
      generating a machine learning model based on the labeling data added by the annotation recognition engine to the plurality of data objects; and
      configuring the machine learning model based on additional labeling data indicated by input received via a user interface.

9. The computer system of claim 8, wherein the operations further comprise validating the machine learning model based on industry-specific feedback.

10. The computer system of claim 8, wherein the annotation recognition engine comprises a generative Artificial Intelligence (AI) solution that is configured to process the unstructured data to identify the respective attributes and to add the labeling data.

11. The computer system of claim 8, wherein the labeling data added by the annotation recognition engine is associated with data of a common and non-industry-specific type.

12. The computer system of claim 11, wherein the additional labeling data indicated by the user input is associated with industry-specific data, different than the data of the common and non-industry-specific type.

13. The computer system of claim 8, wherein:
the user interface is configured to display the labeling data added to the plurality of data objects by the annotation recognition engine, and
the input, received via the user interface, confirms or edits the labeling data added by the annotation recognition engine.

14. The computer system of claim 8, wherein the operations further comprise:
identifying a filtered set of object data based on a querying input, and
generating a second query-specific machine learning model based on the filtered set of object data.

15. One or more non-transitory computer-readable media storing instructions executable by a processor, wherein the instructions, when executed by the processor, cause the processor to perform operations comprising:
ingesting, from a plurality of data sources, a plurality of data objects that comprise unstructured data;
determining, by executing an annotation recognition engine configured to process the unstructured data of the plurality of data objects without user input, respective attributes of the plurality of data objects;
adding, via the annotation recognition engine, labeling data to the plurality of data objects, wherein:
the labeling data comprises at least one of annotation data or metadata corresponding to the respective attributes of the plurality of data objects;
generating a machine learning model based on the labeling data added by the annotation recognition engine to the plurality of data objects; and
configuring the machine learning model based on additional labeling data indicated by input received via a user interface.

16. The one or more non-transitory computer-readable media of claim 15, the operations further comprising validating the machine learning model based on industry-specific feedback.

17. The one or more non-transitory computer-readable media of claim 15, wherein the annotation recognition engine comprises a generative Artificial Intelligence (AI) solution that is configured to process the unstructured data to identify the respective attributes and to add the labeling data.

18. The computer-implemented method of claim 1, wherein:
generating the machine learning model based on the labeling data added by the annotation recognition engine comprises training a first non-industry-specific version of the machine learning model,
the additional labeling data is associated with industry-specific data, and
configuring the machine learning model based on the additional labeling data comprises training or retraining the machine learning model based at least in part on the additional labeling data to create a second industry-specific version of the machine learning model.

19. The computer-implemented method of claim 1, wherein the additional labeling data comprises at least one of additional annotation data or additional metadata, different from the at least one of the annotation data or the metadata indicated by the labeling data added by the annotation recognition engine.

20. The computer-implemented method of claim 1, wherein the plurality of data objects is associated with a plurality of data formats, and the ingesting comprises converting the unstructured data of the plurality of data objects into a uniform file format.

\* \* \* \* \*